United States Patent [19]

Fattinger

[11] 4,242,321
[45] Dec. 30, 1980

[54] PROCESS FOR SEPARATING $SO_2$ FROM A CURRENT OF GAS CONTAINING THE SAME, AND PLANT FOR CARRYING OUT SUCH PROCESS

[75] Inventor: Volker Fattinger, Arlesheim, Switzerland

[73] Assignee: Ciba-Geigy Corporation, Ardsley, N.Y.

[21] Appl. No.: 12,262

[22] Filed: Feb. 15, 1979

Related U.S. Application Data

[63] Continuation of Ser. No. 838,708, Oct. 3, 1977, abandoned.

[30] Foreign Application Priority Data

Jul. 21, 1977 [CH] Switzerland ................. 9063/77

[51] Int. Cl.³ .............................................. C01B 17/82
[52] U.S. Cl. ..................................... 423/523; 423/524
[58] Field of Search ................. 423/523, 524, DIG. 5, 423/235

[56] References Cited

U.S. PATENT DOCUMENTS

| | | | |
|---|---|---|---|
| 1,486,757 | 3/1924 | Jensen | 423/524 |
| 1,800,786 | 4/1931 | Fairlie | 423/523 |
| 1,889,973 | 12/1932 | Miller | 423/524 |
| 2,053,834 | 9/1936 | Kachkaroff et al. | 423/523 |

FOREIGN PATENT DOCUMENTS

| | | | |
|---|---|---|---|
| 1140909 | 10/1959 | Fed. Rep. of Germany | 423/523 |
| 270988 | 5/1927 | United Kingdom | 423/524 |
| 363327 | 6/1930 | United Kingdom | 423/524 |
| 759056 | 10/1956 | United Kingdom | 423/524 |
| 172728 | 8/1965 | U.S.S.R. | 423/523 |

OTHER PUBLICATIONS

Apachow et al., Chem. Zentralblatt 127, 14151 (1956).
Riegel Industrial Chemistry, 5th edition, Reinhold Publishing Corp., NY, NY, 1949, pp. 1–11.

Primary Examiner—Earl C. Thomas
Assistant Examiner—Gary P. Straub
Attorney, Agent, or Firm—Harry Falber

[57] ABSTRACT

A process is described for separating $SO_2$ from a current of gas containing the same, at least intermittently, in a concentration which is impermissibly high for discharge into the ambient atmosphere, with attendant production of sulfuric acid by the nitrogen oxide process, in which latter process the $SO_2$-containing gas initially flows through a dentriation zone, or first through a pretreatment zone forming a first sector of an $SO_2$-processinbg zone and then through the denitration zone, thereafter through the main sector of the $SO_2$-processing zone, and subsequently through a nitrogen oxide absorption zone, in the course of which flow it is brought into contact in at least one of the two sectors of the $SO_2$-processing zone with dilute acid having a $H_2SO_4$-concentration of less than 70% by weight (55° Be) which acid is circulated through the sector concerned of this latter zone, while in the absorption zone the nitrogen oxides released in the denitration zone are absorbed by sulfuric acid, and nitrose-containing acid having a $H_2SO_4$-concentration of 70 to 80% by weight (55° to 63.5° Be) is drawn off from the absorption zone and fed into the denitration zone, which process further comprises (a) measuring the content of NO in the current of gas at a point in the absorption zone or downstream of the absorption zone or simultaneously at points both in the absorption zone and downstream thereof, and (b) introducing a nitrogen-oxygen compound, or a substance which contains such a compound, into the dilute acid cycle of at least one of the two sectors of the $SO_2$-processing zone when a specific limit value of the NO-content or of the steepness of an increase per unit of time of the NO content in the current of gas at the NO-control point or points is exceeded.

A plant for carrying out this process in practice is also described.

27 Claims, 5 Drawing Figures

PROCESS FOR SEPARATING SO₂ FROM A CURRENT OF GAS CONTAINING THE SAME, AND PLANT FOR CARRYING OUT SUCH PROCESS

This is a continuation of application Ser. No. 838,708 filed on Oct. 3, 1977, now abandoned.

SUMMARY OF THE INVENTION

The invention relates to a process for separating $SO_2$ from a current of gas containing the same, at least intermittently, in a concentration which is impermissibly high for discharge into the ambient atmosphere, with attendant production of sulfuric acid by the nitrogen oxide process, in which latter process the $SO_2$-containing gas initially flows either through a denitration zone or through a pretreatment zone constituting a first sector of an $SO_2$-processing zone and then through the acid denitration zone, thereafter through the main sector of the $SO_2$-processing zone, and subsequently through a nitrogen oxide absorption zone, the current of the gas being brought into contact in at least one of the two sectors of the $SO_2$-processing zone with dilute acid having a concentration of less than 70% by weight (55° Bé) of $H_2SO_4$ which is circulated through the respective sector of this latter zone, whilst in the absorption zone the nitrogen oxides released in the denitration zone are absorbed by sulfuric acid, and nitrose-containing acid having a $H_2SO_4$-concentration of 70 to 80% by weight (55° to 63.5° Bé) is drawn off from the absorption zone and fed into the denitration zone.

The nitrogen process for the production of sulfuric acid is over 100 years old and is described for example in the following books:

Winnacker-Küchler, Chemische Technologie, Vol. II, Carol Hauser-Verlag, Munich, Germany, 1970, p. 38 ff.

Ullmann's Enzyklopaedie der Technischen Chemie, 1964, Vol. 15, p. 432 ff.

In the second reference, the term "nitrose process" is used.

To prevent atmospheric pollution, it has become increasingly necessary in recent times to process $SO_2$-containing off gases of relatively low $SO_2$ content. Although the nitrogen oxide-sulfuric acid process is superior to the catalytic contact process when using $SO_2$-containing gases of low $SO_2$-concentration, as regards investment as well as operating costs, this process has hitherto been unable to gain acceptance even for the purpose of environmental protection. One reason probably is that it has hitherto been relatively difficult to operate a nitrogen oxide-sulfuric acid plant with waste gases having only low concentrations of nitrogen oxides and, in particular, to operate this kind of plant in such a manner that no yellow trail is visible in the spent gas issuing from the discharging chimney into the atmosphere.

Nitrogen oxide-sulfuric acids plants usually consist of several packed towers which are connected in series and have different acid cycles. Substantial losses of nitrogen oxide occur when there is an excess of NO or an excess of $NO_2$ in the waste gases. A correct ratio of $NO:NO_2$ is a prerequisite for an optimal absorption of the nitrogen oxides; NO is an invisible gas. Wrong control of a nitrogen oxide-sulfuric acid system can therefore result within a short time in the loss of large amounts of nitrogen oxides in the spent gas discharged into the atmosphere without a yellow trail being visible. It is known to be advantageous to operate a nitrogen oxide-sulfuric acid system in such a manner that the spent gases have a barely yet definitely still recognisable yellow shade. A number of measures are known for increasing the $NO_2$ content and lowering the NO content of the spent gases in a nitrogen oxide-sulfuric acid system; namely (i) increased addition of nitric acid, (ii) reducing the cooling in the production towers, and/or (iii) increased addition of water to the production towers.

An adjustment of certain conditions in one packed tower of the system always has repercussions in other packed towers and it is relatively difficult to maintain the entire system in equilibrium. For this reason, known nitrogen oxide-sulfuric acid systems usually require experienced personnel in order to be able to operate the plant with insignificant losses of nitrogen oxides.

Thus it is known that loss of nitrogen oxides from the system must be compensated for by the addition of nitric acid or of concentrated nitrose gases, for example those resulting from the catalytic oxidation of ammonia. In known nitrogen oxides-sulfuric acid plants the addition of nitric acid or the addition of strong nitrogen oxides-containing gases is carried out either at the head of the denitration tower or upstream of a production tower which is irrigated with an acid having a $H_2SO_4$-concentration higher than 70% by weight. In known nitrogen oxide-sulfuric acid systems, the necessity of adding nitric acid or strong nitrogen oxides-containing gases is perceived in particular from the content of nitrose in the acid which flows down from the absorption zone into the sump of this zone. For this acid has the highest nitrose content of all acids present in the system.

In the following description of the invention, all towers of a system irrigated with sulfuric acid having a concentration higher than 70% by weight and which give off gases containing more gaseous nitrogen-oxide compounds than are contained in the gas entering the tower, are assigned to the denitration zone.

"Production" towers of Petersen plant which comply with this condition are thus considered by definition as belonging to the denitration zone. Whether the acid in the outlet of a gas-liquid reaction unit, e.g. a tower, contains nitrose or is free from nitrose is not applied as a criterion for the term "denitration unit" or "denitration tower". Acid having a concentration of less than 70% by weight of $H_2SO_4$ is also used to irrigate a gas drying tower described hereinafter which is associated with the pretreatment zone as far as acid flow is concerned and which is not considered as belonging to the denitration zone, not even when it gives off gaseous nitrogen oxides.

In known nitrogen oxide-sulfuric acid plants, an addition of nitric acid or other substances which contain nitrogen oxides is made at any point of the above-defined "denitration zone". In known nitrgoen oxide-sulfuric acid plants the control of the color of the spent gases of the system that is to say the control of the ratio of $NO:NO_2$ in these gases, is usually made by the addition of more or less water to the acid cycles through the denitration zone and through the nitrogen oxide absorption zone.

A constant surveillance of the plant requiring numerous analyses of the density and of the nitrose content of the circulating acid is therefore necessary and an automated control of the known system is hardly possible. A further disadvantage of known nitrogen oxide-sulfuric acid systems resides in the very sluggish response to adjustments of the $NO:NO_2$ ratio in the gases. If, for example, a drop in the $SO_2$-content of the entry gas results in the formation of a yellow streak of off gas being emitted from the system, this requires adjustments of the above-mentioned nature to be made in the operation of the plant which only become effective after several hours and cause this yellow shade of the emitted gas to disappear again.

OBJECTS AND SUMMARY OF THE INVENTION

The invention described hereinafter solves in particular the task of adjusting the composition of the waste gases of a nitrogen oxide-sulfuric acid system within a few minutes and, in addition, of making it possible to automate the entire system. It is a further object of the invention to provide an improved, rapid adjustment of the $NO:NO_2$ ratio of the gases emitted from the system which releases them without or practically without a yellow shade (due to the presence of $NO_2$ therein) at the off gas-emitting stack, while avoiding at the same time excessive loss of (colorless) NO from the system.

It is yet another object of the invention to provide an improved emission of gases from the aforesaid system wherein the content of nitrogen oxides is inferior to an upper limit prescribed by law (e.g. 400 ppm).

The invention is preferably applied to the initially described process which has been disclosed in German Offenlegungsschrift No. 2,510,294, German Offenlegungsschrift No. 2,609,505 and U.S. Pat. No. 4,148,868.

The above-mentioned task is solved by means of a process of the kind initially described and which comprises:

(a) measuring the content of NO in the current of gas in the absorption zone or downstream of the absorption zone or simultaneously both in the absorption zone and downstream thereof, and (b) introducing a nitrogen-oxide compound or a substance with contains such a compound into the dilute acid cycle of at least one of the two sectors of the $SO_2$-processing zone when a specific limit content of NO as reflected approximately by the existing NO emission standard is exceeded or when the slope reflecting the rate of increase of the NO content in the current of gas passing through the NO control point exceeds a limit value set for said slope.

It has been found that, by these measures, an optimum $NO:NO_2$ ratio in the absorption zone or in the spent gases of the absorption zone can be obtained in the course of a few minutes, and that, in addition, it is possible to automate the entire system if, depending on the NO content of the gases which leave the absorpotion zone, nitric acid or other liquid or gaseous substances which contain nitrogen bonded to oxygen are fed into the dilute acid or into the $SO_2$-processing zone which is irrigated with dilute acid. The dilutic acid loses added nitric acid or other compounds which contain nitrogen oxide relatively quickly. During the consumption of the nitrogen content of the dilute acid a surprisingly strong reaction takes place, whereby the processing of $SO_2$ is speeded up considerably. It is an important feature of the invention that the nitric acid or the nitrogen oxides are brought into the liquid phase (of dilute acid). The liquid which is or contains a nitrogen-oxygen compound (e.g. nitric acid) can be introduced, either per se or mixed with the dilute acid, into the packing of a tower of the $SO_2$-processing zone, and in such a manner that a mixing of added liquid and dilute acid takes place in the packings of the towers of this zone.

"Nitrogen-oxygen compounds" are those compounds which normally occur or are used in the nitrogen oxide process, that is to say NO, $NO_2$, $N_2O_3$, nitrose or nitric acid and optionally also solid "chamber crystals". Nitrous acid is immediately oxidised to nitric oxide in the nitrogen oxide process or gives off $N_2O_3$ or forms nitrose with sulfuric acid.

Gaseous substances which contain nitrogen bonded to oxygen are thus gases which contain NO or $NO_2$ or $N_2O_3$. Liquid substances are in particular nitric acid itself or nitrose.

Preferably, the amount of substance containing nitrogen-oxygen compound is increased proportionately to the rise in the NO content of the current of gas in or after the absorption zone.

In plants of simple layout, however, the rate of addition of substance containing nitrogen-oxygen compound can also be kept constant so long as the NO content of the current of gas downstream of the absorption zone exceeds the limit content of NO mentioned hereinbefore.

In another mode of operation, the amount of substance which contains nitrogen-oxygen compound is increased at the same rate as a limit value of the steepness of the increase per unit of time of the NO content in the current of gas in or downstream of the absorption zone is exceeded. Preferably nitric acid is used as nitrogen-oxygen cmpound.

In addition, the nitrogen-oxygen compound consists preferably of nitrogen oxides produced by the combustion of ammonia.

A liquid substance containing nitrogen bonded to oxygen can be produced in particular by the absorption of nitrogen oxides in sulfuric acid.

The addition of the above-mentioned nitrogen oxygen compound or the substance containing the same is preferably interrupted when the NO content of the current of gas downstream of the absorption zone falls below a fixed value which is lower than the above-mentioned limit content of NO; or the addition of the substance is reduced when the NO content in the current of gas downstream of the absorption zone drops below a predetermined limit value of the steepness of the rise per unit of time, in which case the last mentioned limit value of the steepness corresponds approximately to that defined under (b), supra.

In a particularly advantageous operation it is preferred (a') to measure also the $NO_2$ concentration of the current of gas downstream of the absorption zone, and (b') to interrupt the addition of the cited substance to the dilute acid cycle of the $SO_2$-processing zone when a specific content of $NO_2$ is exceeded or when a steepness limit of the rise of the content of $NO_2$ in the current of gas at the $NO_2$ control point is exceeded.

In this connection it is also advantageous (c') to increase the amount of nitrose-containing acid flowing out of the absorption zone and correspondingly to introduce into this zone nitrose-impoverished or nitrose-free acid from the denitration zone (i) when a second, higher limit value of the content of $NO_2$ in the current of gas downstream of the absorption zone is exceeded, or (ii) when a second, higher steepness limit of the rise in the content of $NO_2$ in the current of gas downstream of the absorption zone is exceeded.

At least a part of the substance introduced into the $SO_2$-processing zone can consist of nitrose-containing sulfuric acid taken from the absorption zone, in which case in particular the content of nitrogen-oxygen compound in the nitrose-containing sulfuric acid taken from the absorption zone and to be introduced into the $SO_2$-processing zone can be increased by the addition of nitric acid.

In a particularly preferred method of carrying out the process of the present invention, a pretreatment zone through which a separate cycle of dilute acid flows and through which the current of gas is passed before it enters the denitration zone, is provided upstream of the denitration zone, and a portion of the total amount of the substance containing nitrogen-oxygen compound, or the latter per se, is introduced into this pretreatment zone. The amount of this substance or compound introduced into the pretreatment zone can be diverted from a nitrose-containing sulfuric acid which flows from the absorption zone into the $SO_2$-processing zone. At least a portion of the amount of nitrogen-oxygen compound to be introduced into the pretreatment zone can consist of gaseous nitrogen oxides which are produced by the oxidation of ammonia and are preferably introduced into the current of gas before this latter enters the pretreatment zone.

The content of nitrogen-oxygen compound in the nitrose-containing sulfuric acid taken from the absorption zone which acid is partly to be introduced into the main sector of the $SO_2$-processing zone and partly into the sector of the latter zone constituting the pretreatment zone can, also in this case, be increased by addition of nitric acid.

Furthermore, the density of the acid leaving the denitration zone can be kept constant by the addition of dilute acid or water, whilst the density of the dilute acid circulating through the main sector of the $SO_2$-processing zone can be kept constant by the addition of acid from the pretreatment zone or of water.

It is a futher object of the invention to provide a plant for separating $SO_2$ from a current of gas which contains this substance, at least intermittently, in a concentration which is impermissibly high for discharge into the ambient atmosphere, with attendant production of sulfuric acid by the nitrogen oxide process, the operation of which plant is controlled dependent on the constant of NO, or of NO and $NO_2$ and/or of the $NO:NO_2$ ratio in the spent gases of the system.

Such a plant comprises in succession:

(a) a denitration zone, (b) a $SO_2$-processing zone, and (c) a nitrogen oxide absorption zone, each zone comprising at least one gas-liquid reaction apparatus which is provided with a sump for taking up liquid which leaves the bottom of the respective apparatus, (d) a line for the gas current which, in succession, enters at one end, preferably the bottom end, of the denitration zone and leads from one end, preferably the top end, of this zone to the $SO_2$-processing zone and from this latter zone to the nitrogen oxide absorption zone and finally from one end, preferably the top end, of the latter zone into the atmosphere, (e) a line for circulating dilute acid through the $SO_2$-processing zone, and finally (f) a line for circulating acid from the first sump, taken in the direction of flow of the gas current, of the nitrogen oxide absorption zone to the top end of the denitration zone and from the sump of this zone to one end, preferably the top end, of a reaction apparatus of the nitrogen oxide absorption zone, wherein there are provided in said plant according to the invention (g) a feed line for nitrogen-oxygen compound in liquid or gaseous phase which is connected to the dilute acid-circulating line (e) through the $SO_2$-processing zone, (h) a measuring device for measuring the content of NO in the gas current which device is connected to the absorption zone or the line (d) for the gas current downstream of the absorption zone, or simultaneously to the absorption zone and to the line (d) downstream of the absorption zone, and (i) a control device for adding nitrogen-oxygen compound through the feed line (g) dependent on the NO-current determined by the measuring device (h).

In a further improved embodiment of the plant according to the invention a device for measuring the content of $NO_2$ in the gas current is provided, which device is connected to the line for the gas current downstream of the absorption zone, and the control device (i) comprises a superimproved regulating device (k) which interrupts or reduces the supply of nitrogen-oxygen compound through the line (g) contingent on the content of $NO_2$ in the current of gas measured by the $NO_2$ measuring device.

In preferred embodiments of the above plant, the feed line for adding nitrogen-oxygen compound in the form of nitrose-containing sulfuric acid can be connected to the sump of a reaction apparatus of the nitrogen oxide absorption zone. This last mentioned feed line can be provided with a means for introducing nitric acid thereinto.

A preferred plant of the invention of the above kind can comprise a pretreatment zone, upstream of the denitration zone, having a reaction apparatus and sump, whilst the line for the current of gas then passes firstly into this pretreatment zone, preferably at the lower end thereof, and from the other end thereof to one end, preferably the bottom end, of the denitration zone, and there can then be provided a separate line for circulating dilute acid therethrough, preferably passing through the pretreatment zone from the top downward, as well as an equalising line between the sumps of the pretreatment zone and the denitration zone, and a branch line from the above-mentioned feed line to the top end of the pretreatment zone.

A unit for the combustion of ammonia equipped with a column for at least partial or total absorption of the nitrogen oxides formed therein by sulfuric acid can also be provided and a separate feed line can connect the base of this column with one end, preferably the top end, of a first reaction apparatus taken in the direction of flow of the gas current of the $SO_2$-processing zone in order to introduce nitrogen oxide-containing sulfuric acid into the latter zone.

Furthermore, such a plant can comprise a pretreatment zone of the above described kind which is upstream of the denitration zone, wherein a feed line for oxides of nitrogen-containing gases connects the top end of the column of a ammonia combustion unit with the line which introduces the current of gas into the pretreatment zone, and preferably into the bottom end thereof.

The feed line (g) can be connected to the sump of a reaction apparatus of the nitrogen oxide absorption zone in order to take up nitrogen-oxygen compound in the form of nitrose-containing sulfuric acid and a branch line can pass from this latter line to the top end of the column of the ammonia combustion unit.

This branch line from the feed line (g) can be connected by means of a secondary branch line to the top end of the pretreatment zone.

BRIEF DESCRIPTION OF THE DRAWINGS

Further details of the invention are apparent from the following description with reference to the attached drawings, in which the schematic view shown in.

DETAILED DESCRIPTION OF THE EMBODIMENTS SHOWN IN THE DRAWINGS

The simplest embodiment of the plant of a nitrogen oxide-sulfuric acid system of the present invention, illustrated in FIG. 1, comprises conventional gas-liquid contact columns which contain packings and for simplicity's sake are referred to hereinafter as "towers".

Downstream from the denitration tower 2, in the direction of flow of the current of gas, there is the $SO_2$-processing zone with a first tower 3 and a second tower 4, and downstream therefrom, there are provided packings 5 and 6 housed in a single tower, and constituting the nitrogen oxide absorption zone. Similar to the plant described in German Offenlegungsschrift No. 2,609,505, the waste gas to be treated which contains $SO_2$ is introduced through the inlet line 102 into the bottom end of the denitration tower 2 and passes through the line 32 from the head of the tower 2 into the head of the tower 3 of the $SO_2$-processing zone, from the bottom end of the packing in tower 3 through the gas line 42 into the bottom end of the packing of tower 4 of the same zone and from the head of the tower 4 through the gas line 52 into the bottom end of the packing 5 of the tower containing the latter and on from there into the bottom end of the packing 6 in the same tower and from the top end of this packing through gas line 72 with the aid of the ventilator 167 into the surrounding atmosphere.

Figure 1:
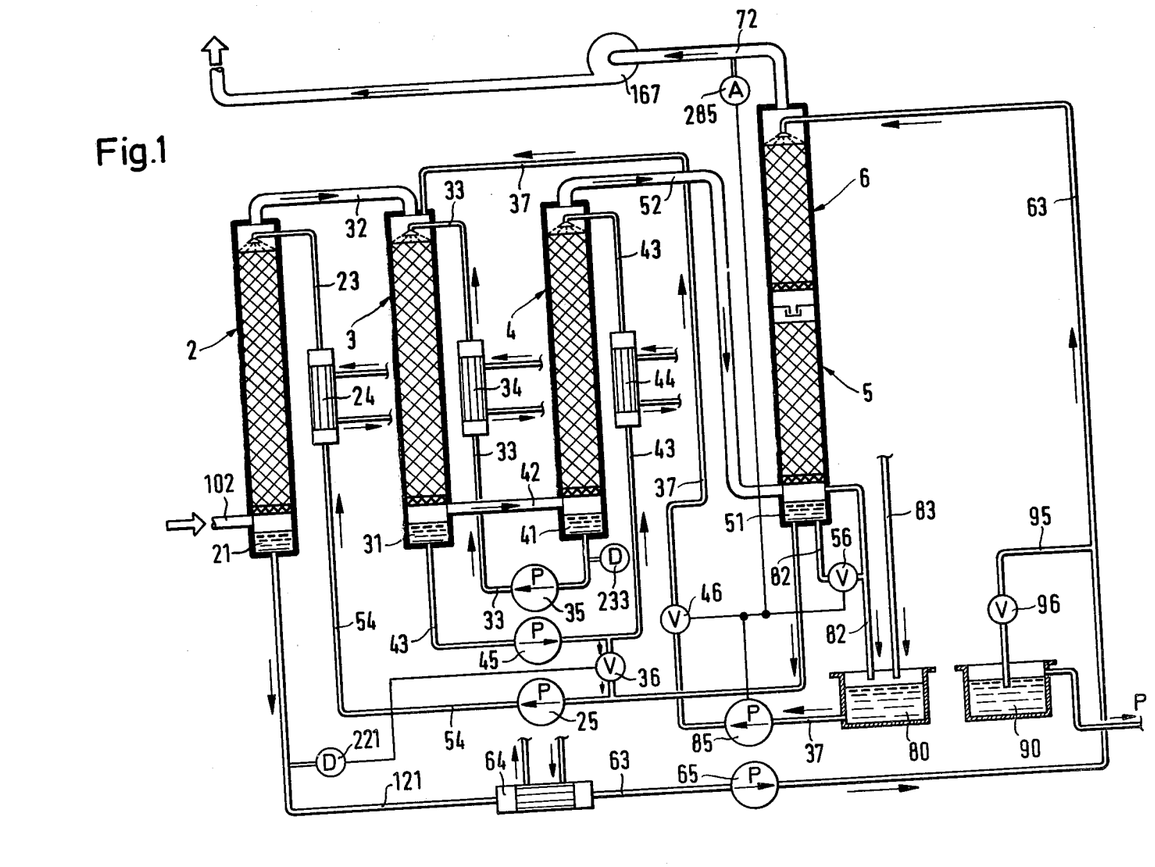
FIG. 1 is a first, particularly simple embodiment of the plant according to the invention.

As in the above-mentioned known plant, dilute acid is also circulated, in the plant described in FIG. 1, through the dilute acid feed line 33 by means of a pump 35 via a heat exchanger 34 to the top end of the packing of tower 3 and collects at the bottom end of this tower in the sump 31 from which the dilute acid is pumped by the pump 45 through the line 43 via the heat exchanger 44 to the top end of the packing of tower 4. The dilute acid cycle through the $SO_2$-processing zone is closed by pumping off the dilute acid from the sump 41 of the tower 4 through the line 33. Preferably, sulfuric acid having a $H_2SO_4$-concentration of about 65% by weight is used as dilute acid in this cycle.

The density of the dilute acid circulating in the $SO_2$-processing zone is measured by the density measuring device 233 at the exit of the acid from the sump 41. The density can be controlled in a known manner by adding either water or acid. The corresponding valves and lines have, however, been omitted from FIG. 1 for the sake of clarity.

Similar to the known plant, nitrose-containing sulfuric acid is pumped from the sump 51 of the common tower of the nitrogen-oxide absorption zone which sump is provided beneath the packing 5, through the line 54 by means of the pump 25 into the heat exchanger 24 and, being heated therein, on through the acid feed line 23 and onto the top end of the denitration tower 2 for irrigation of the packing therein. After passing through the packing of tower 2, the resulting denitration acid collects in the sump 21 of this tower and is pumped by the pump 65 through the line 121 to the heat exchanger 64 and onward through the line 63 to the top end of the upper packing 6 in the tower of the nitrogen oxide absorption zone.

From the packing 6 the acid flows directly downward into th packing 5, whilst the gas to be treated passes from the packing 5 directly into the packing 6. In this case, accordingly, no gas cutoff is necessary between the two packings.

Denitrated sulfuric acid having a $H_2SO_4$-concentration of 70 to 80% by weight can be diverted from line 63 through a line 95 and a valve 96 therein into the acid container 90 and drawn off from the plant through a discharge line at P.

The denitration step is thus effected in known manner in the packing of the tower 2. The $SO_2$-processing step takes place in the packings of the towers 3 and 4 and the nitrogen oxide absorption step is effected in the packings 5 and 6 of the common tower therefor. A sulfuric acid having a $H_2SO_4$-concentration of less than 70% by weight (dilute acid) is used in the $SO_2$-processing zone (towers 3 and 4). An acid having a $H_2SO_4$-concentration between 70 and 85% by weight (absorption acid) is used in the denitration zone (tower 2) and in the nitrogen oxide absorption zone (towers 5 and 6). Preferably the $H_2SO_4$-concentration of the absorption acid is between 72 and 80% by weight.

As in the known nitrogen oxide-sulfuric acid process, nitrogen oxide is also set free from the acid introduced in the process of the invention in the denitration zone and passes via the gas route into the absorption zone where the gaseous nitrogen oxide is absorbed by sulfuric acid. As illustrated in FIG. 1, this procedure takes place as follows: the nitrose-free absorption acid, which flows from the packing of tower 2 into the sump 21, is cooled in the cooler 64 and is passed by the pump 65 via the line 63 into the packing 6 and then flows into the packing 5 and from there into the sump 51 and is conveyed onward through the line 54 by the pump 25 and through the heat exchanger 24 and the line 23 back to the packing of the tower 2 where the nitrogen oxides which have been absorbed by the packings of the towers 5 and 6 are again released into the current of gas.

Furthermore, acid is additionally pumped in a manner known per se from the sumps of each tower to the head of the same in order to intensify the mass transfer between the gas and the acid. The corresponding installations, however, are not shown in the drawing for the sake of clarity. Only those acid feed lines are indicated which effect an acid exchange between different packings.

According to the invention, a container 80 which contains nitric acid or a sulfuric acid with a high concentration of nitrose and/or nitric acid is provided in the plant of FIG. 1. Nitric acid is passed through the line 83 into the container 80. A line 82 provided with a valve 56 is connected to the sump 51 of the nitrogen oxide absorption zone and leads to the container 80. Nitrose-containing sulfuric acid can be discharged through line 82 into the container 80 which is further connected, via the line 37 in which the pump 85 and the valve 46 are provided, to the head of the first tower 3 of the $SO_2$-processing zone.

An analyser 285 is connected to gas current line 72 and continuously measures the content of NO in the gases flowing therethrough from the packing 6 of the tower of the absorption zone. When the content of NO rises above a permissible value, or when the increase of the concentration of NO exceeds a fixed rate, the pump 85 is put into operation by means of a signal from analyser 285, and sulfuric acid having a high concentration of nitric acid flows through the valve 46 and the line 37 into the packing of tower 3.

When the analyser 285 indicates that the NO content of the gases which leave the absorption zone has fallen below a fixed value, or when the rate of decrease of the nitrogen oxide content in these gases exceeds a minimum rate of decrease, the operation of pump 85 is interrupted. Instead of putting the pump 85 into or out of operation, it will be understood that the flow of sulfuric acid having a high content of nitric acid can also be regulated, increasing or decreasing the same as required. The delay of response in the control system to a signal given by the analyser is only a few minutes.

In the plant of FIG. 1, the analyser 285 is shown installed at the top end of the packing of the absorption tower 6. It is also possible to measure the nitrogen oxide content at the entry of the gases into the packing 5 of the absorption tower or between the packings 5 and 6 of the absorption zone. It will be appreciated that the nitrogen oxide content at these points is correspondingly higher than at the outlet of the absorption zone. However, it is also possible to use a measurement taken within a packing of the absorption zone as the regulating value. This affords a reduction of the delay of the response to the signal. It is also possible, and in special cases advantageous, to carry out a NO-measurement simultaneously at different points of the nitrogen oxide absorption zone.

It has further been found that it is advantageous to carry out the addition of nitrogen-oxygen compound or of a liquid or gaseous substance containing the same as far upstream in the system as possible. Thereby, it is possible to exert a considerable influence on the NO-content of the spent gases of the plant even when introducing only relatively small amounts of nitrogen-oxygen compound. The invention thus makes it possible to automate a nitrogen oxide-sulfuric acid system.

Figure 2:
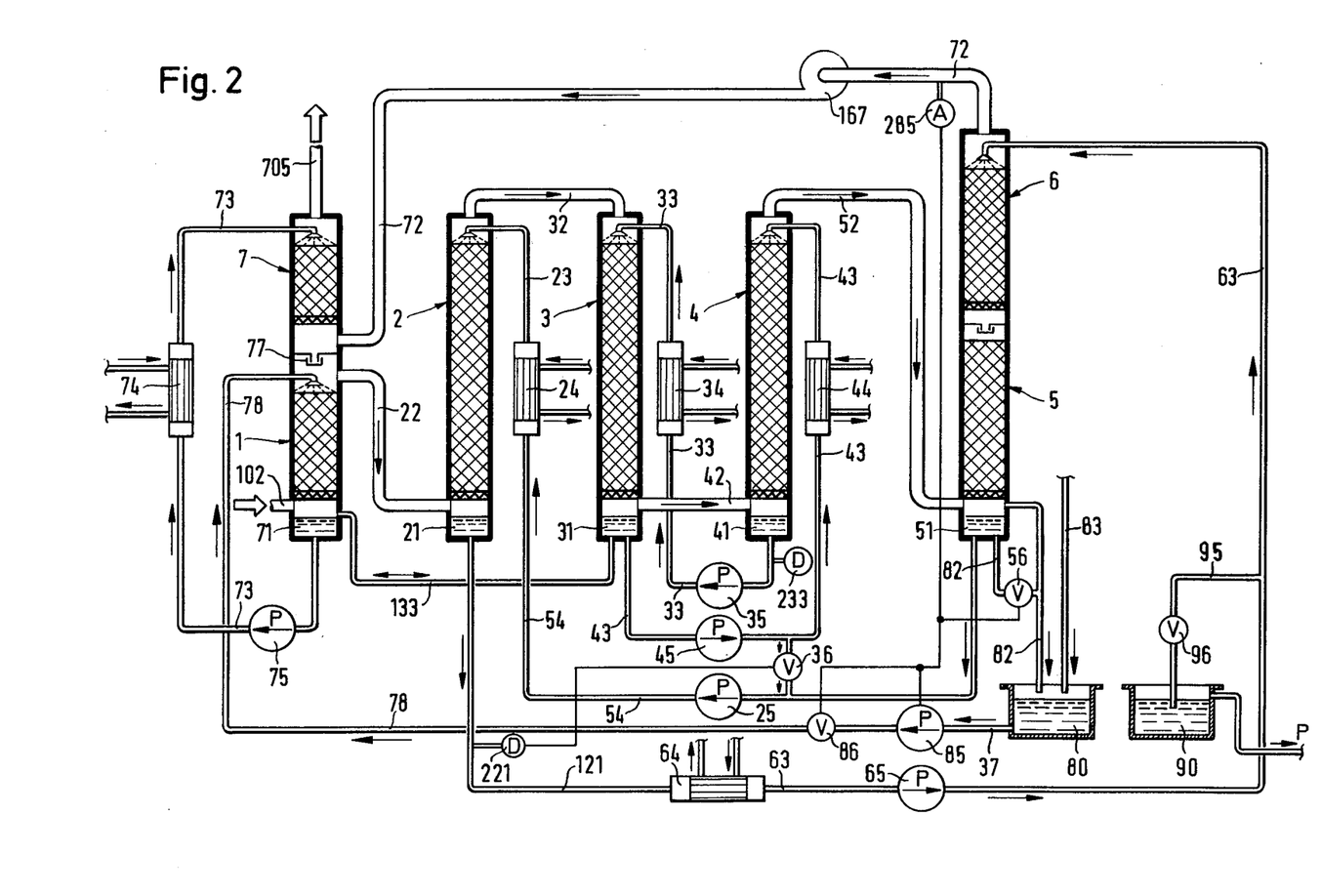
FIG. 2 is a second embodiment, similar to that shown in FIG. 1, but provided with a pretreatment zone wherein nitrogen-oxygen compound from the nitrogen oxide absorption zone is introduced only into the pretreatment zone.

An embodiment of this feature is illustrated in the plant according to the invention shown in FIG. 2. In this embodiment, moist gases which contain $SO_2$ are brought into contact, in a manner known from German Offenlegungsschrift No. 2,609,505, with dilute acid in a pretreatment tower upstream of the denitration zone, part of the water vapor content being extracted from these gases in the packing of tower 1. The dilute acid which flows down from the packing of the tower 1 into the sump 71 of this tower is then transported by means of the pump 75 through the line 73 and the heat exchanger 74, which heats the acid, and further through the line 73 to the head of the tower 7 the packing of which constitutes an acid dehydration zone.

Additional heating of the acid in the heat exchanger 74 intensifies the elimination of water from the acid in the packing of the tower 7. The tower 1 of the pretreatment zone shown in FIG. 2 constitutes, in this embodiment of the invention, a first sector of the $SO_2$-processing zone.

The dilute acid cycle through the pretreatment zone via the line 73, is separated from the dilute acid cycle of the main zone of the $SO_2$-processing zone, and is closed by having the dilute acid, conveyed via line 73 to the top of the tower 7, irrigating the packing therein, and then flowing through this packing and through the gas-liquid shut-off 77 at the bottom end of tower 7 into the packing of the tower 1 therebelow.

The amount of water absorbed by this acid during its circulation through the packing of tower 1 is thus carried via line 73 directly to the end of the entire system, i.e. into the packing of the tower 7, wherein it is released in the form of water vapor into the spent gas of the system fed to the tower 7 through the line 72.

When passing through the pretreatment zone in the tower 1, the dilute acid has already been warmed up. As stated, the additional heating of the acid in the heat exchanger 74 intensifies the release of water in the packing of the tower 7. The evaporated water leaves the system as steam together with the $SO_2$-free spent gases through the line 705.

By means of this dehydration step which dries the current of gas in the pretreatment zone, less or no water vapour at all is introduced with the current of gas into the remainder of the system, thus rendering it possible to maintain constantly a sufficient acid concentration (e.g. 75% by weight of $H_2SO_4$) in the packing of the denitration tower 2 as well as in the packings 5 and 6 of the absorption zone.

By controlling the supply of fuel to the heat exchanger 74, it is possible to regulate the amount of water released from the acid circulating through the packings of the towers 7 and 1, whereby a desired concentration of the acid in this cycle can be maintained.

According to the invention, nitric acid, or sulfuric acid which contains nitrose or nitrose and nitric acid, is conveyed from the container 80 by means of the pump 85 through the line 37 to the valve 86 and further through the line 78 to the top of the packing in the tower 1 which packing is irrigated therewith whenever the NO-analyser 285 opens the valve 86 and puts the pump 85 into operation. Thereby the advantages described above, of the process of the invention, are realised in a fully automatic manner. In this preferred embodiment of the invention, as illustrated in the plant of FIG. 2, tower 1 which is irrigated with dilute acid and is positioned, in the direction of gas flow, upstream of the denitration zone, is thus used for controlling the entire system. This packed tower 1 or a corresponding gas-liquid reaction apparatus of another type which is irrigated with dilute acid and is located, in the direction of gas flow, upstream of the remainder of the system, is accordingly charged with the total amount of nitrogen-oxygen compound or of the liquid or gaseous substance which contains such compound. The bottom end of the packing of the tower 7 is connected via the line 72 with the ventilator 167 and receives through that line dry spent gases from the packing of tower 6 of the absorption zone. These spent gases extract water from the acid in the packing of tower 7 and pass, together with the water vapour, through the line 705 into the surrounding atmosphere.

Hitherto, it was customary to regulate the ratio of $NO:NO_2$ in the spent gas of the plant or in the absorption zone of the nitrogen oxide-sulfuric acid plant by altering the concentration of the acids in certain cycles of the plant. This was accomplished by adding water or dilute acid to a more concentrated acid in at least one of these cycles. In contrast thereto, such altering the acid concentrations can be dispensed with in controlling the system according to the present invention. It suffices to keep the density of the acids constant at the exit of the denitration zone and in the cycle through the $SO_2$-processing zone. These acid densities can be kept constant by means of known automatic density control devices. As is apparent from FIG. 2, the density measuring device 221 is provided in the discharge line 121 from the sump 21. This measuring device regulates the valve 36, whereby a desired amount of dilute acid is conveyed by means of the pump 25 through the line 23 into the packing of the denitration tower 2. The density measuring device 221 regulates the addition of dilute acid in such a manner that, at the exit of the denitration zone, i.e. the outlet of the packing of the denitration tower 2, a constant acid concentration is maintained.

An equalising line 133 connects the sumps 71 and 31 and so ensures an equalisation of the acid level in both sumps.

Figure 3:
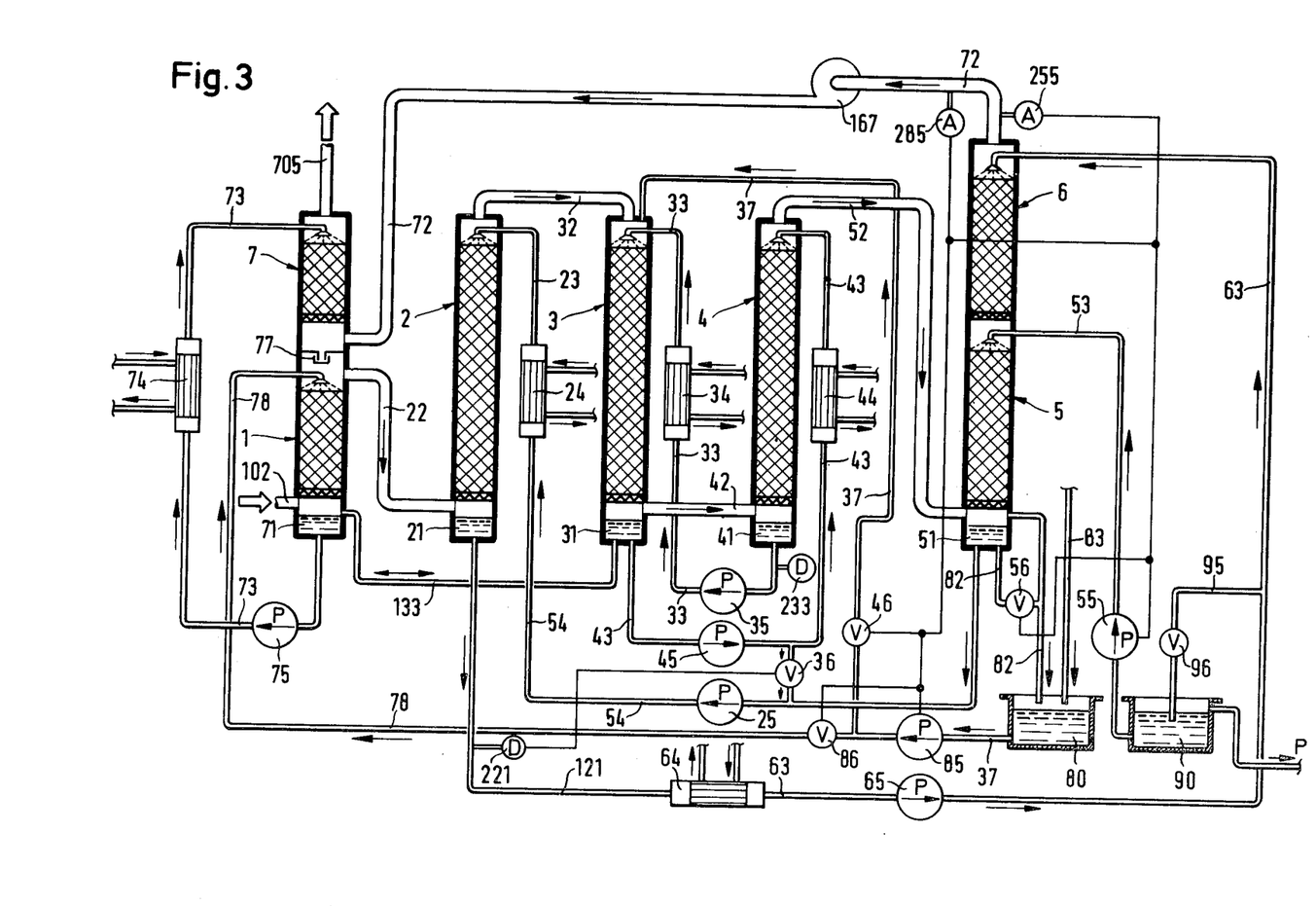
FIG. 3 is a third embodiment with a pretreatment zone, wherein nitrogen-oxygen compound is introduced both into the pretreatment zone and into the main sector of the $SO_2$-processing zone and, in addition, a measuring device for $NO_2$ is provided.

In a further embodiment of a plant according to the invention illustrated in FIG. 3, it is not the total amount of nitrogen-oxygen compound or of substance containing such compound which is introduced into the first sector of the $SO_2$-processing zone, namely into the first tower of the pretreatment zone, but only a portion thereof, whilst the remaining portion is introduced, as in the embodiment of FIG. 1, into the top of tower 3, i.e. into the main sector of the $SO_2$-processing zone. The weight ratio of the aforesaid portions which pass, respectively, into the first sector and into the main sector of the $SO_2$-processing zone, can be regulated by corresponding adjustment of the valves 46 and 86.

The greater the contact area between gas and liquid in the reaction towers of the $SO_2$-processing zone, the greater the advantageous acceleration of the chemical reactions which occur during the $SO_2$-processing step.

By simultaneously introducing nitrogen-oxygen compound into the first sector of the $SO_2$-processing zone and into the main sector of the $SO_2$-processing zone, i.e., into the packings of the towers 1 and 3, a much greater area corresponding to the sum of the volumes of the packings of the towers 1 and 3 is irrigated and a correspondingly increased speeding up of the whole $SO_2$-processing is achieved.

In a further preferred mode of operation in accordance with the invention which can be carried out in the embodiment illustrated in FIG. 3, the $NO_2$-content of the gases is measured in addition to the above-described NO-content; this is done in analyser 255, within or downstream of the absorption zone. This analyser 255 is coupled with a control device of known type (not shown) which is superimposed on the previously described control device 285 which device measures the NO-content of the gases. As soon as the NO-content exceeds a fixed value, the addition of substances which contain nitrogen-oxygen compound is interrupted or reduced. Furthermore, when the $NO_2$ content is too high or the increase of the $NO_2$ concentration is too rapid, nitrose-containing sulfuric acid is drawn off beyond the normal rate from the absorption zone by regulating the valve 56 accordingly, and a corresponding amount of nitrose-free or nitrose-impoverished acid is introduced into the absorption zone, The analyser 255 measures the concentration of $NO_2$ in the gases continuously at the exit of the packing 6. As soon as the content of $NO_2$ rises above a fixed value or the concentration of $NO_2$ rises too rapidly, the pump 85 is stopped, thereby interrupting the addition of sulfuric acid having a high concentration of nitric acid from the container 80 into the packing of the tower 3. The pump 55 is also controlled by the analyser 255. When the content of $NO_2$ rises too sharply at the exit of the packing 6 this pump is put into operation and in addition the valve 56 is opened, whereupon nitrose-containing acid flows into the container 80 and nitrose-free acid flows from the container 90 through the line 53 onto the packing 5 of the absorption tower. The nitrose-free absorption acid flushes the nitrose-containing acid from the packing 5 into the sump 51 and through the line 82 into the container 80.

When the addition of nitrogen oxygen compound is made not in the form of nitric acid but of gaseous nitrogen oxides, it is less advantageous to introduce the gaseous nitrogen oxides directly into the packings of the towers 3 and 4 of the $SO_2$-processing zone. Rather, a more rapid and more powerful action is achieved by first dissolving the nitrogen oxides in sulfuric acid and then introducing the resulting nitrogen-oxides containing sulfuric acid into the $SO_2$-processing zone.

Figure 4:
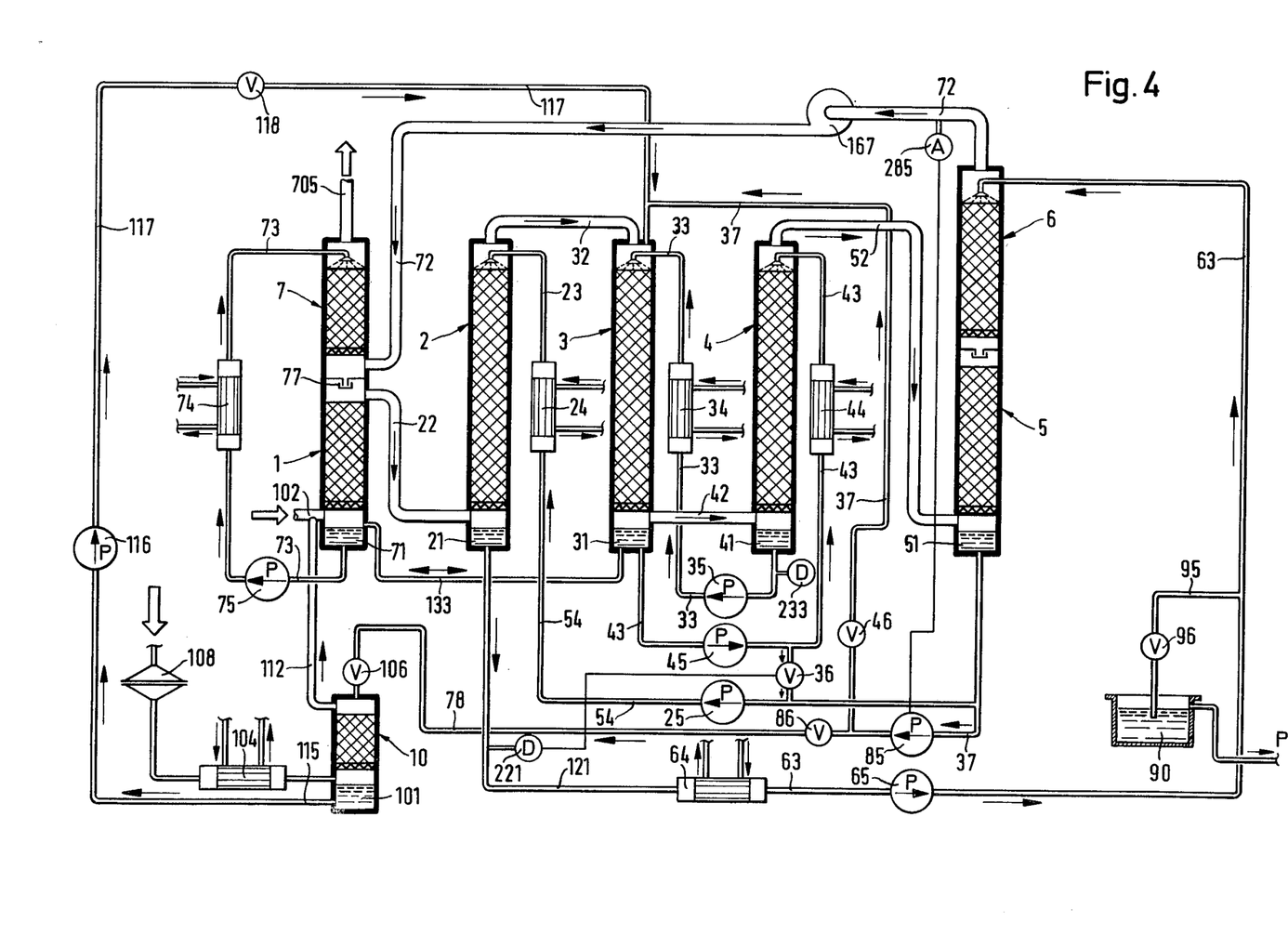
FIG. 4 is a further embodiment, similar to that shown in FIG. 3, with a pretreatment zone and an ammonia combustion unit for producing nitrogen oxides; and, finally.

In the embodiment of a plant according to the invention illustrated in FIG. 4, an ammonia-oxidising unit is designated by the reference numeral 108. The nitrogen oxides formed therein are cooled in a heat exchanger 104 and subsequently flow through an absorption column 10 from the bottom upward. That portion of the nitrogen oxides which is not absorbed in the column 10 passes through a line 112 into the entry line 102 for gas to be treated and thus into the main gas current of the plant. Acid can be passed from the line 78 through the valve 106 into the column 10, in which it is saturated with nitrogen oxides. This acid then passes via the sump 101 and through the line 115 to the pump 116 and through the line 117 and the valve 118 into the packing of the tower 3.

Figure 5:
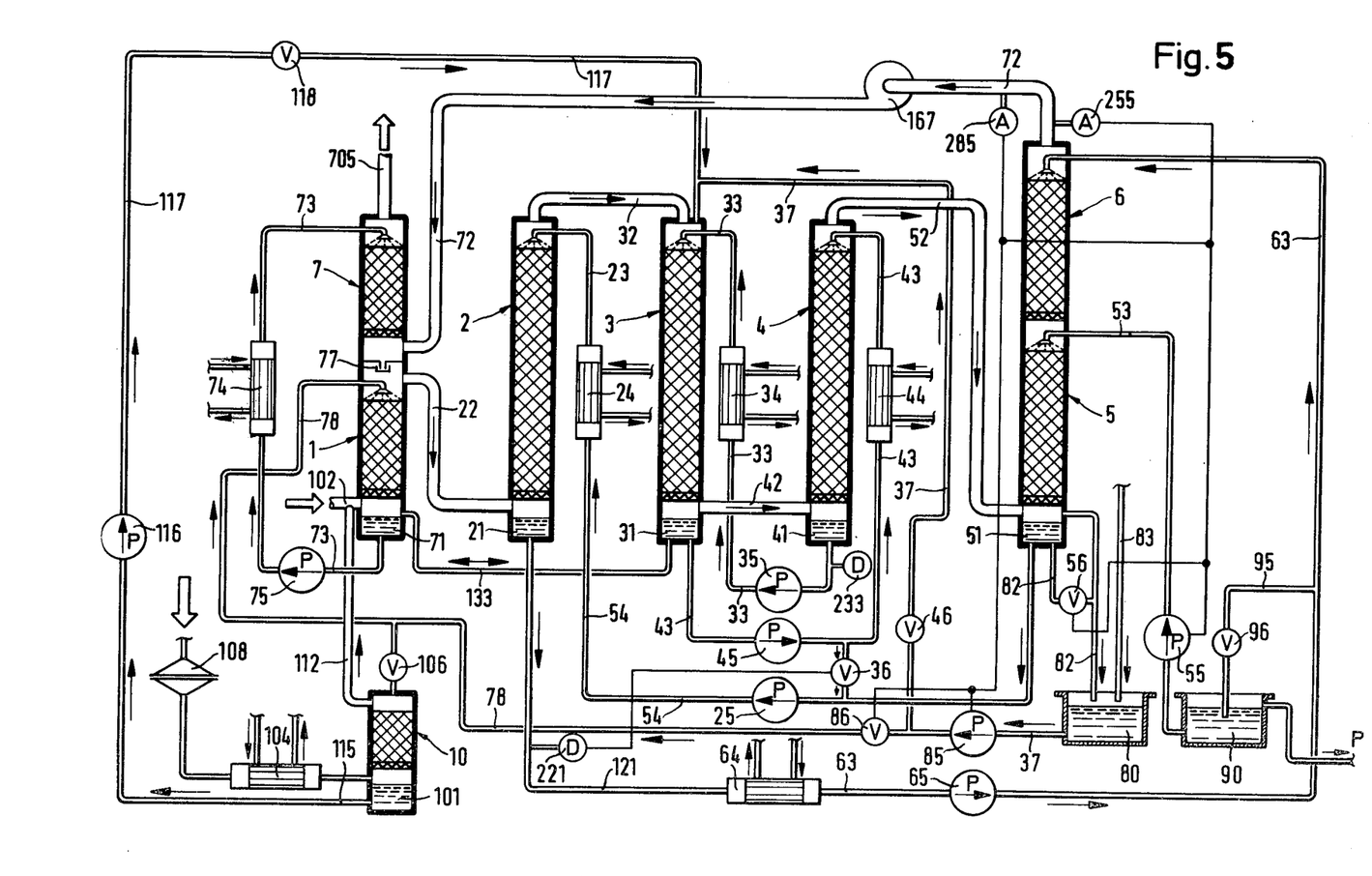
FIG. 5 is an embodiment similar to that of FIG. 4 in which, however, as in the embodiments of FIGS. 2 and 3, nitrogen-oxygen compound-containing acid from the absorption zone can be introduced both into the pretreatment zone and into the main sector of the $SO_2$-processing zone.

Finally, FIG. 5 shows a complete plant which combines all the features of the embodiments of the plants of FIGS. 1 to 4 and permits, depending on the nature and $SO_2$-content of the gases to be processed and depending furthermore on whether, intermittently, more ammonia or more nitric acid is to be consumed in the plant to carry out the treatment of the $SO_2$-containing waste gases by the process according to the invention in an economically optimum manner.

The following non-limitative example illustrates the method of carrying out the process of the present invention in the plant embodiment shown in FIGS. 3 and 5.

EXAMPLE

A current of gas is treated which contains $SO_2$ and, per $Nm^3$ (1 normal cubic meter = 1 $m^3$ at 0° C. and 1 bar), the following gram-molecular amounts:
$SO_2$; 0.5–0.9 mole
$H_2O$; 2.8–3.1 moles
$O_2$; 4–6 moles
$CO_2$; 1.2–1.6 moles
NO; 0.01–0.02 mole,
the balance consisting of nitrogen.

A controllable amount of this gas is introduced into the packing of the tower 1 of a plant as shown in FIG. 3. The volume of the packing of each of the towers 1 and 7 is 1 $m^3$. The volume of the packing of each of the towers 2 to 6 is 2.6 $m^3$. The sum of the volumes of all the packings of the towers 1 to 7 is accordingly 15 $m^3$. Polyethylene bodies of the type described in German Offenlegungsschrift No. 2,416,955 are used to form tower packings. The packing of each tower has a surface area of 300 $m^2/m^3$. The acid turnover in the packing of the towers 1 and 7 is effected as illustrated in FIG. 3 and amounts to 2 liters per $Nm^3$ of gas. The packing of the tower 2 is irrigated with 1 liter of acid per $Nm^3$ of gas in the manner illustrated in FIG. 3. Each of the packings of the towers 3 and 4 are irrigated with 3.3 liters of acid per $Nm^3$ of gas. The irrigation of the packing of the absorption towers is intensified by a pump and a recycling line which are not shown in FIG. 3. This non-illustrated pump transports acid from the sump 51 to the packing 5, so that, together with the flow of acid shown in FIG. 3, the packing is irrigated with a total of 4 liters of acid per $Nm^3$ of gas. The temperature of the acid at the outlet of the heat exchangers 74 and 24 is 64° C. The temperature of the acid leaving the heat exchangers 34, 44 and 64 is between 30° and 40° C. Calculated for a temperature of 15° C., the circulated acids have the following weights per liter:
packings 1 and 2: 1.5 kg/liter (48.1° Bé = 59.7 weight-% of $H_2SO_4$)
packings 2, 5 and 6: 1.67 kg/liter (57.9° Bé = 74.66 weight-% of $H_2SO_4$)
packings 3 and 4: 1.56 kg/liter (51.8° Bé = 65.2 weight-% of $H_2SO_4$)

The nitrogen oxides absorbed in the packings 5 and 6 of the absorption tower are transported by the pump 51 through the line 23 to the packing of the tower 2 in which these nitrogen oxides, as a result of their reaction with $SO_2$, pass as NO into the current of gas which leaves the packing of the tower 2 through the line 32. The higher the content of nitrogen oxides in the current of gas, the more effective is the $SO_2$-processing in the packings of the towers 3 and 4.

One liter of nitrose-containing acid per $Nm^3$ of gas is passed through the line 23 into the packing of the tower 2. The higher the nitrose content of the acid the greater the amount of $SO_2$-containing gas which can be processed in the system. However, if the nitrose content of the acid is too high, the nitrogen oxide content of the spent gases of the system increases. To control the nitrose content of the acid in the sump 51, nitric acid which is fed to the container 80 through the line 83 is pumped from the latter container by means of the pump 85 through the valve 46 and the line 37 to the packing of the tower 3.

The nitrogen oxides which are set free in the packing of this tower 3 and of the subsequent tower 4 pass through the gas lines 42 and 52 into the packing 5 of the absorption tower and are there absorbed by the sulfuric acid and are thus transported into the sump 51.

The introduction of gas in an amount of 400 $Nm^3$/hour at a nitrose concentration of the acid in the sump 51 of 2% by weight, calculated as $HNO_3$, results in a spent gas from the entire system in the line 705 which contains 50 to 100 ppm of NO and 200 to 300 ppm of $NO_2$. If the amount of gas introduced into the system is 500 $Nm^3$/hour instead of 400 $Nm^3$/hour, or if the content of $SO_2$ in the entry gas increases while the amount of gas remains constant, the system can no longer process the $SO_2$ present in the gas completely and some $SO_2$ will pass into the absorption zone, whereby the NO content of the spent gases of the system increases.

In order to process the increased amount of $SO_2$ without substantial losses of nitrogen oxides, it would be necessary—if the measures of the present invention are not applied—to increase the nitrose concentration of the acid which is introduced into the packing of the tower 2, and/or to increase the amount of acid which is introduced into the packing of the tower 2. If 500 $Nm^3$/hour of gas have to be processed, the nitrose concentration of the acid in the sump 51 must be increased to about 3% by weight, calculated as $HNO_3$, when the normal amount of 1 liter of acid per $Nm^3$ of gas is applied to irrigate the packing of tower 2.

If, in order to achieve the same object, in lieu of one of the two last-described measures, nitric acid were added to the packing of the denitration tower 2, then, such addition, which would be intrinsically possible, would have to be carried out stepwise, because it requires several minutes until a change in the nitrogen oxide content of the gases downstream of the absorption zone occurs. Too large an addition of nitric acid or a drop in the $SO_2$ content of the entry gases would, however, result in an increase of $NO_2$ and consequently in a yellow coloration of the spent gases of the system. To remove this yellow coloration it would then be necessary to increase the concentration of the acid in the denitration zone and in the absorption zone. To do so, the addition of water or dilute acid would be reduced or cut off. However, it would be several hours before the concentration of $NO_2$ in the spent gas would fall again below 400 ppm.

In contrast thereto, by carrying out the process according to the invention, it is possible to compensate for an increase or a drop of the $SO_2$-concentration in the entry gases, as well as a change in the volume of flow of the $SO_2$-containing gas, without the occurrence of a significant loss of nitrogen oxides in the spent gases through the stack of the plant. An increase of the $SO_2$-content in the gas to be treated causes an increase in the NO-content of the gases, which is continuously measured in the analyser 285, downstream of the absorption zone, beyond the normal operational value of 100 ppn to, for example, 150 ppm. An automatic control device then puts the pump 85 into operation, whereby a sulfuric acid which has a concentration of 20% by weight of nitric acid is pumped from the container 80 through the lines 78 and 37 into the packings of the towers 1 and 3. The valves 86 and 46 are so controlled that 0.4 liter per minute of acid flows to the packing of the tower 1 and 0.6 liter per minute of acid flows to the packing of the tower 1 and 0.6 liter per minute of acid to the packing of the tower 3. After the short delay of only two minutes the NO-content in the gas at the exit of the absorption zone falls below 100 ppm and the operation of pump 85 is interrupted. The nitric acid added to the dilute acid of a two cycles through the towers 1 and 3, respectively, is consumed after about 15 minutes and is given off in the form of gaseous nitrogen oxides. These nitrogen oxides are absorbed by the acid in the absorption zone, whereby the nitrose content of the acid in the sump 51 rises.

However, the nitrose increase is still not sufficient to cause in the packing of the denitration tower a reaction commensurate with the increased content of $SO_2$ in the current of gas. After about 12 minutes the NO-content of the spent gases again increases to above 150 ppm, whilst the $NO_2$-content falls from a maximum of 250 ppm to below 150 ppm. The analyser 285 once more activates the pump 85 and, again after two minutes, the NO-content of the gase downstream from the absorption zone falls below 100 ppm, whereby the operation of pump 85 is again interrupted.

This procedure of activating and deactivating the pump 85 is repeated until the content of nitrose in the sump 51 has become adjusted to the increased amount of $SO_2$ in the current of gas entering the line 102 in order to be processed in the system. The closer the nitrose content in the sump 51 approaches the value necessary for a complete processing of $SO_2$ in the system, the longer the interval between two switching periods.

If, on the other hand, the amount of gas which has to the processed in the system decreases, or if the concentration of $SO_2$ in the gas to be treated falls, then the $NO_2$-content of the gases increases downstream of the absorption zone and the NO-content falls far below 100 ppm. The $NO_2$-content of the spent gases of the absorption zone is measured continuously by the analyser 255. If the $NO_2$-content per minute increases by more than 30 ppm per minute, and/or if the $NO_2$-content rises to above 200 ppm, the pump 85 is stopped by an automatic control device (not shown) if the pump was in operation at this time. At an increase in the $NO_2$-content of more than 50 ppm per minute and/or at an $NO_2$-content higher than 300 ppm per minute and/or an $NO_2$-content higher than 300 ppm, an automatic control device, of a type known per se and responsive to analyser 255, opens the valve 56 and activates the pump 55, whereby nitrose-containing sulfuric acid flows into the container 80, whilst nitrose-free sulfuric acid is pumped from the container 90 by the pump 55 through the line 53 to the packing 5 of the absorption zone. The amount of acid added and drawn off is 0.3 liter per $Nm^3$ of gas. After about 3 minutes the $NO_2$-content of the gases downstream of the absorption zone falls below 200 ppm and the automatic control device closes the valve 56 and interrupts the operation of pump 55. A nitric acid concentration of 20% by weight is attained in the container 80 by the addition of nitric acid through the valve 83.

As already explained above, in periods of the entry of gases having a high content of $SO_2$, the acid stored in the container 80 is returned to the system.

Sulfuric acid, which flows from the container 90 through the discharge line P, is formed in proportion to the amount of $SO_2$ processed in the system.

By means of the described control devices, it is possible to keep the $N_xO_y$ content (sum of the NO and $NO_2$ content) of the spent gases of the system constantly below 400 ppm, even when the amount of gas to be processed or the $SO_2$-concentration in the latter is subject to frequent fluctuations in a range as large as ±70% by weight of the daily average value.

The weight per liter (or density) of the acid cycles is controlled as follows: The density of the acid in the cycle through the packings of the towers 1 and 7 is kept at 1.5 kg/liter by controlling the heat supply in the heat exchanger 14. Increased supply of heat intensifies the elimination of water in the packing of the tower 7 and therefore increases the acid density. The density of the acid in the cycle through the packings of the towers 3 and 4 of the $SO_2$-processing zone is kept at 1.56 kg/liter by the controlled addition of acid from the sump 71. The corresponding lines and valves are not shown. The acid density at the exit of the denitration tower 2 is kept at 1.67 kg/liter by controlled addition of dilute acid from the sump 31 to the packing of the tower 2.

Analysers and controlling devices of the kind used in the plant according to the invention are well-known. Analysers are manufactured, for example, by the Termo Electron Corporation, Waltham, Mass., USA and are designated as "$NO_x$ chemoluminiscent source analyzer for automative emission" or as "$NO$-$NO_x$ chemoluminiscent analyzer", for example "Model 44".

A circuit to be used for a control responsive to such analysers is described for example in the article "Automatisierung Regelungstechnik" in Meyers Handbuch über die Technik, Biographisches Institut Mannheim, Germany, Allgemeiner Verlag 1971, pp. 721–736. If, for example, a NO- or $NO_2$-analyser of the kind described above is used instead of the thermoelement shown in FIG. 1 of this article, then the illustrated valve is controlled by means of the electric measuring transducer MU and control R. A more detailed illustration of the component of the electric measuring transducer MU up to a valve of a pump is illustrated in the left-hand half of FIG. 8 of the same article.

I claim:

1. In the production of sulfuric acid by the nitrogen oxide process conducted in a system of gas-liquid contact columns, in which process the $SO_2$-containing gas initially flows through a denitration zone, thereafter through a $SO_2$-processing zone consisting essentially of at least one packed tower, and subsequently through a nitrogen oxide absorption zone, in the course of which flow it is brought into contact in said $SO_2$-processing zone with dilute acid having a $H_2SO_4$ concentration of less than 70% by weight which acid is circulated through the last-mentioned zone, said gas flow from said $SO_2$-processing zone while in the absorption zone having the nitrogen oxides released into the gas flow in the denitration zone absorbed by sulfuric acid, and nitrose-containing acid having a $H_2SO_4$ concentration of 70 to 80% by weight is drawn off from the absorption zone and fed into the denitration zone, the improvement which comprises (a) measuring the content of NO in the current of gas at a point in the absorption zone or simultaneously at points both in the absorption zone and downstream thereof, and (b) introducing a nitrogen-oxygen compound selected from the group consisting of NO, $NO_2$, $N_2O_3$, nitrose-containing sulfuric acid and nitric acid into the liquid phase of the dilute acid cycle of at least one packed tower of the $SO_2$-processing zone when a specific NO-content limit value of the NO-content set to comply with the existing NO emission standard is exceeded or when the slope reflecting the rate of increase of the NO-content in the current of gas, passing through said NO control point or points defined in (a) exceeds a limit value set for said slope, while in either case said NO-content is still below said standard, said nitrogen-oxygen compound being introduced in an amount sufficient to decrease the NO-content below said first specific limit value or to decrease said slope below said slope limit value.

2. The process of claim 1 wherein the amount of nitrogen-oxygen compound introduced is increased proportionately to the increase in the NO-content of the current of gas in or downstream of the absorption zone.

3. The process of claim 2, wherein the addition of nitrogen-oxygen compound is interrupted when the NO-content of the current of gas downstream of the absorption zone falls below a fixed value which is lower than the specific limit-value of NO.

4. The process of claim 1, wherein the nitrogen-oxygen compound introduced to said $SO_2$-processing zone is kept constant as long as the NO-content of the current of gas measured in or downstream of the absorption zone or at both points exceeds the said specific NO-content limit value.

5. The process of claim 1, wherein the amount of nitrogen-oxygen compound introduced is increased at the same rate as the rate of increase of steepness of said slope when the slope limit value of the NO-content in the current of gas in or downstream of the absorption zone is exceeded.

6. The process of claim 5, wherein the addition of nitrogen-oxygen compound is reduced when the slope reflecting the rate of increase in the NO-content in the current of gas downstream of the absorption zone falls below a predetermined slope limit value of the rate of increase in the NO-content, the slope limit value corresponding approximately to that defined under (b).

7. The process of claim 1, wherein the amount of nitrogen-oxygen compound introduced is kept constant as long as the slope limit value of the increase of the NO-content in the current of gas in or downstream of the absorption zone is exceeded.

8. The process of claim 1, wherein the nitrogen-oxygen compound is formed by the absorption of nitrogen oxides in sulfuric acid.

9. The process of claim 1, wherein the $NO_2$-concentration of the current of gas at a point downstream of the absorption zone is measured; and the addition of nitrogen-oxygen compound to the dilute acid cycle through the $SO_2$-processing zone is interrupted when a first specific limit value of the $NO_2$-content or a first slope limit value reflecting the rate of increase of the $NO_2$-content in the current of gas passing through the $NO_2$-control point is exceeded.

10. The process of claim 9, wherein the amount of nitrose-containing acid flowing from the absorption zone is increased and nitrose-impoverished or nitrose-free acid from the denitration zone is correspondingly introduced into the absorption zone whenever a second limit value higher than said first limit value of the $NO_2$-content in the current of gas downstream of the absorption zone is exceeded or until a second slope limit value higher than said first slope limit value of the rate of increase of the $NO_2$-content in the current of gas downstream of the absorption zone is exceeded.

11. The process of claim 1, wherein at least a portion of said compound introduced into the $SO_2$-processing zone consists of nitrose-containing sulfuric acid taken from the absorption zone.

12. The process of claim 11, wherein the content of nitrose-containing sulfuric acid taken from the absorption zone and introduced into the $SO_2$-processing zone is increased by the addition of nitric acid to said nitrose-containing sulfuric acid.

13. In the production of sulfuric acid by the nitrogen oxide process conducted in a system of gas-liquid contact columns, in which latter process the $SO_2$-containing gas initially flows through a pretreatment zone positioned upstream of a denitration zone and having a cycle of dilute acid flowing therethrough, said zone forming a first sector of an $SO_2$-processing zone, and then through the denitration zone, thereafter through the main zone of the $SO_2$-processing zone consisting essentially of at least one packed tower, and subsequently through a nitrogen oxide absorption zone, in the course of which flow it is brought into contact in at least one of the two sectors of the $SO_2$-processing zone with dilute acid having a $H_2SO_4$ concentration of less than 70% by weight which acid is circulated through the respective sector of the $SO_2$-processing zone, said gas flow from said $SO_2$-processing zone while in the absorption zone having the nitrogen oxides released into the gas flow in the denitration zone absorbed by sulfuric acid, and nitrose-containing acid having a $H_2SO_4$ concentration of 70 to 80% by weight is drawn off from the absorption zone and fed into the denitration zone, the improvement which comprises
 (a) measuring the content of NO in the current of gas at a point in the absorption zone or downstream of the absorption zone or simultaneously at points both in the absorption zone and downstream thereof, and
 (b) introducing a nitrogen-oxygen compound selected from the group consisting of NO $NO_2$, $N_2O_3$, nitrose-containing sulfuric acid and nitric acid into the liquid phase of the dilute acid cycle of at least one packed tower of at least one of the two sectors of the $SO_2$-processing zone when a specific NO-content limit value of the NO-content set to comply with the existing NO emission standard is exceeded while said NO content is still below said standard or when the slope reflecting the rate of increase of the NO content in the current of gas passing through said NO control point or points defined in (a) exceeds a limit value set for said slope, while in either case said NO content is still below said standard, said nitrogen oxide compound being introduced in an amount sufficient to decrease the NO-content below said first specific limit value or to decrease said slope below said slope limit value.

14. The process of claim 13, wherein the amount of nitrogen-oxygen compound introduced is increased proportionately to the increase in the NO-content of the current of gas in or downstream of the absorption zone.

15. The process of claim 14, wherein the addition of nitrogen-oxygen compound is interrupted when the NO-content of the current of gas downstream of the absorption zone falls below a fixed value which is lower than the specific limit-value of NO.

16. The process of claim 13, wherein the nitrogen-oxygen compound introduced to said $SO_2$-processing zone is kept constant as long as the NO-content of the current of gas measured in or downstream of the absorption zone or at both points exceeds the said specific NO-content limit value.

17. The process of claim 13, wherein the amount of nitrogen-oxygen compound introduced is increased at the same rate as the rate of increase of the steepness of said slope when the specific slope limit value reflecting the rate of increase of the NO-content in the current of gas in or downstream of the absorption zone is exceeded.

18. The process of claim 17, wherein the addition of nitrogen-oxygen compound is reduced when the slope reflecting the rate of increase of the NO-content in the current of gas downstream of the absorption zone falls below a predetermined slope limit value of the rate of the increase in the NO-content, the slope limit value corresponding approximately to that defined under (b).

19. The process of claim 13, wherein the amount of nitrogen-oxygen compound is kept constant as long as said slope limit value of the increase of the NO-content in the current of gas in or downstream of the absorption zone is exceeded.

20. The process of claim 13, wherein the nitrogen-oxygen compound is formed by the absorption of nitrogen oxides in sulfuric acid.

21. The process of claim 13, wherein the $NO_2$-concentration of the current of gas at a point downstream of the absorption zone is measured; and the addition of nitrogen-oxygen compound to the dilute acid cycle through the $SO_2$-processing zone is interrupted when a first slope limit value reflecting the rate of increase of the $NO_2$-content in the current of gas passing through the $NO_2$-control point is exceeded.

22. The process of claim 21, wherein the amount of nitrose-containing acid flowing from the absorption zone is increased and nitrose-impoverished or nitrose-free acid from the denitration zone is correspondingly introduced into the absorption zone whenever a second limit value, higher than said first limit value of the $NO_2$-content in the current of gas downstream of the absorption zone is exceeded or until a second slope limit value higher than said first slope limit valve of the rate of increase of the $NO_2$-content in the current of gas downstream of the absorption zone is exceeded.

23. The process of claim 22, wherein at least a portion of said compound introduced into the $SO_2$-processing zone consists of nitrose-containing sulfuric acid taken from the absorption zone.

24. The process of claim 23, wherein the content of nitrose-containing sulfuric acid taken from the absorption zone and introduced into the $SO_2$ processing zone is increased by the addition of nitric acid to said nitrose-containing sulfuric acid.

25. The process of claim 13, wherein a portion of the total amount of nitrogen-oxygen compound is introduced into said pretreatment zone.

26. The process of claim 25, wherein the portion of said compound introduced into the pretreatment zone consist of nitrose-continaing sulfuric acid which flows from the absorption zone into the $SO_2$-processing zone.

27. The process of claim 25, wherein at least a portion of the amount of compound to be introduced into the pretreatment zone consists of gaseous nitrogen oxides which are produced by the oxidation of ammonia and are introduced into the current of gas before this latter current enters the pretreatment zone.

* * * * *